May 30, 1961 W. M. HAMMOND, JR 2,986,596
TELEVISION WRITING PICK-UP SYSTEMS
Filed Aug. 31, 1953 2 Sheets-Sheet 1

INVENTOR.
WARDLAW M. HAMMOND JR.
BY
C. D. O'Brien
F. L. Styner
ATTYS.

INVENTOR.
WARDLAW M. HAMMOND JR.
BY
[signatures]
ATTYS.

United States Patent Office 2,986,596 Patented May 30, 1961

2,986,596

TELEVISION WRITING PICK-UP SYSTEMS

Wardlaw M. Hammond, Jr., Philadelphia, Pa., assignor, by mesne assignments, to the United States of America as represented by the Secretary of the Navy Filed Aug. 31, 1953, Ser. No. 377,749

5 Claims. (Cl. 178—5.6)

This invention relates to a television display and writing pick-up system and is particularly directed to improved means for transmitting hand formed writings and signals via video signals.

Pictures can be transmitted by television by viewing the picture with a television camera, transmitting the video and synchronizing signals on a carrier via cable or by radiation, and reproducing the picture signals at the receiving station on a kinescope or picture tube screen. In such systems, the various elements of the kinescope picture do not necessarily retain the true positional relationship of the original picture as viewed by the camera. Distortion, for example, may result from nonlinearity and non-registry of the various sweep voltage generators, or from uneven attenuation of the various video frequencies. When the information to be transmitted is plotted points of a map or a graph, positional accuracy of all points is of paramount importance. When televised handwritten information is to be superimposed on a separately televised map, graph or picture, the video signals obtained from different cameras will invariably not coincide, thus causing improper placement of parts of one picture with respect to corresponding parts of the other picture when the two pictures are displayed on one picture tube screen.

Accordingly, an object of this invention is means for so combining video information obtained from different sources that the elements of the superimposed pictures on a display screen bear the proper positional relationships.

A more specific object of this invention is improved means for "writing in" information on a remotely or separately generated video picture signal.

Figure 1:
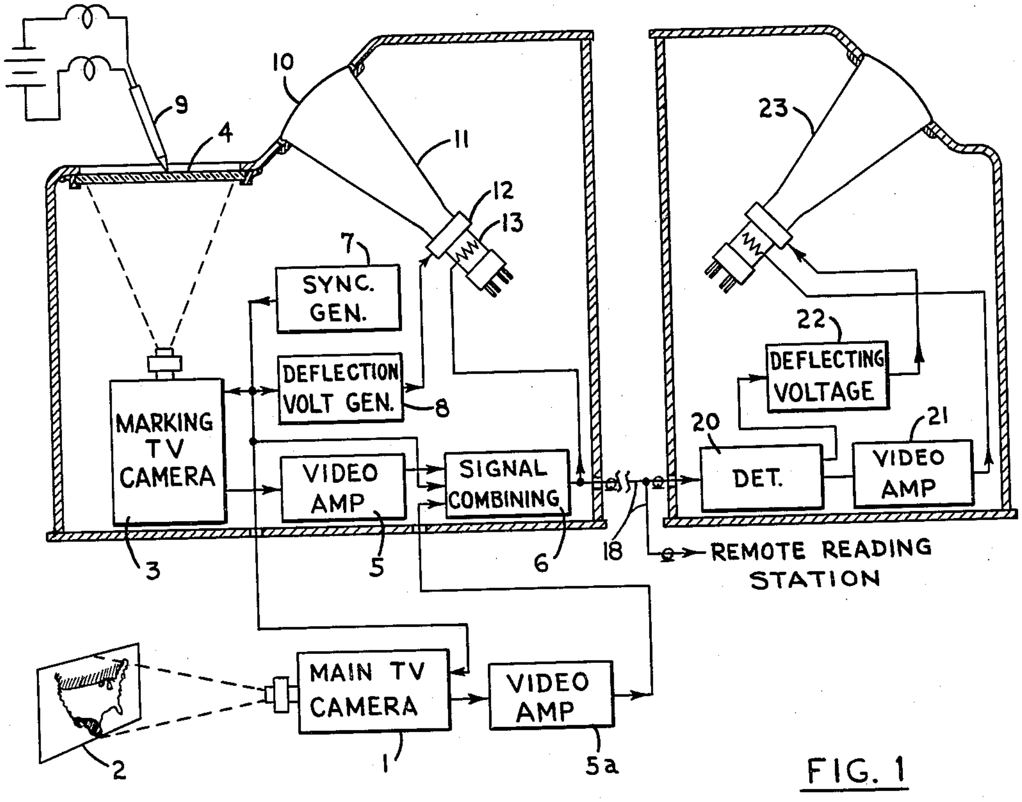
Figure 2:
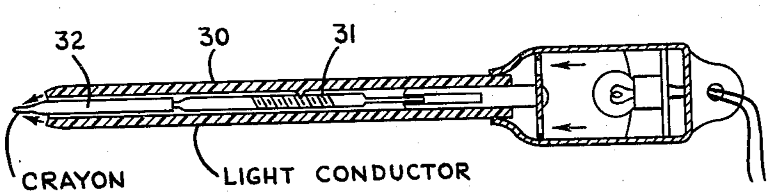
Figure 3:
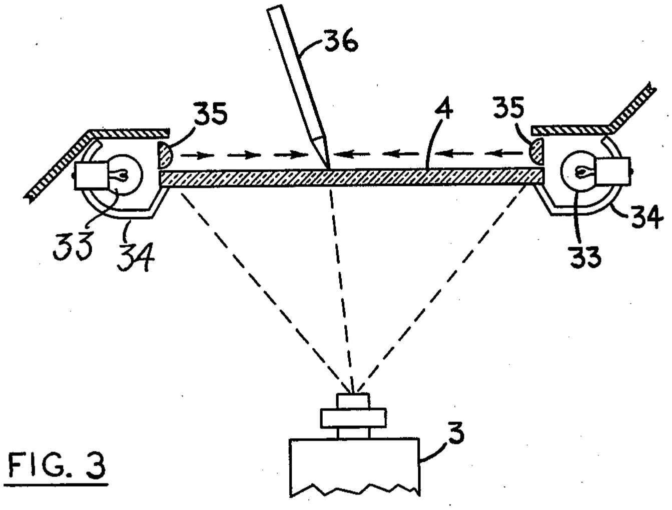
Figure 4:
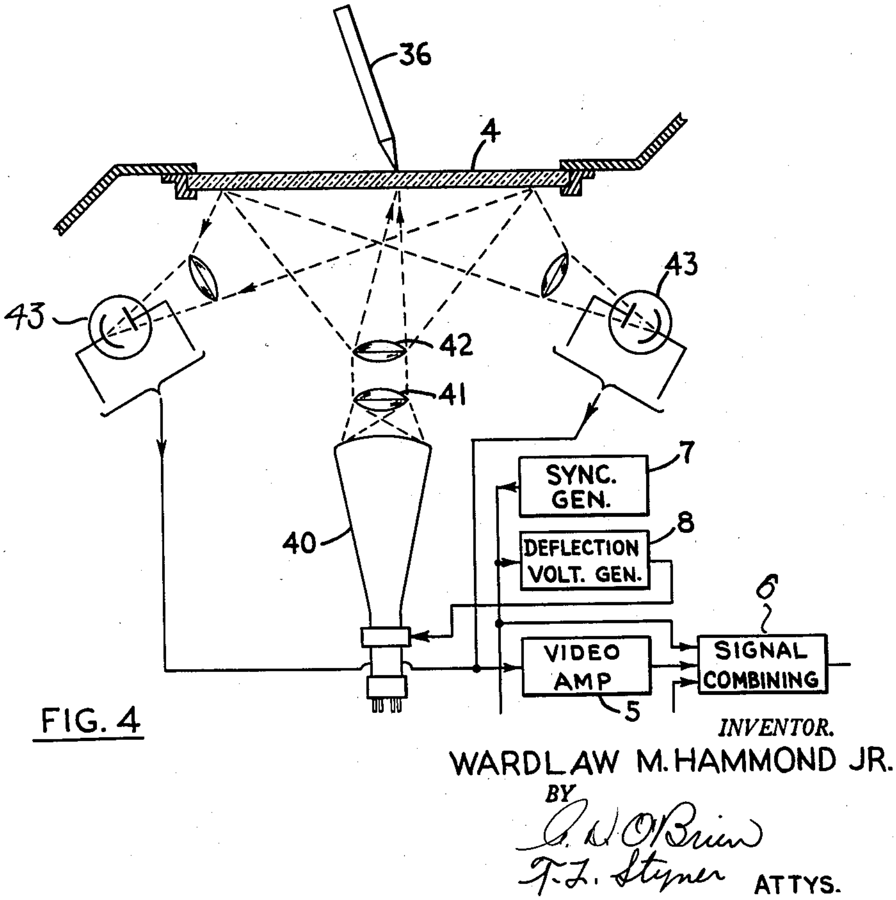

Other objects of this invention will become apparent in the following specific description of preferred embodiments of the invention. The invention is defined with particularity in the appended claims, said embodiments being shown in the accompanying drawing in which:

Fig. 1 is a sectional view of the improved writing pick-up system, with block diagrams of the circuitry involved therein, Fig. 2 is a sectional view of a self illuminated writing instrument of this invention, Fig. 3 shows in section an alternative means for illuminating the writing instrument of this invention, and Fig. 4 shows in section the optical arrangement of the movable pick-up system employing a flying spot-kinescope system.

The novel write-in system comprises two cameras each responsive to variable visible light, one for generating a video signal of a main picture, and the other for generating a video signal of hand formed marks and writings. The two electrical video signals are combined or superimposed one upon the other in a single transmitting circuit, and are reproduced visually on a screen at one or more remote receiving stations. According to this invention the combined video signals are also applied to a local monitoring cathode ray picture tube. Since the placement of the hand formed markings may be guided by the information received from the composite picture on the monitoring screen, this system insures accurate superimposition of one picture upon the other regardless of the distortions usually encountered in video and sweep circuit channels.

In Figure 1 the main television camera 1 is focused upon the picture 2 to be transmitted. The camera contains the usual sawtooth generators for systematically scanning the picture image. Marking television camera 3 is focused upon and scans the underside of the transparent writing panel 4 upon which is written the marks or designs to be superimposed upon the picture 2. Marking camera 3 likewise contains sweep circuit generators for scanning the image of the surface 4. The video output of each camera may be amplified to any extent desired as by amplifiers 5 and 5a, and the two video signals applied to separate input terminals of the signal combining network 6.

A common synchronous pulse generator 7 is coupled to the sweep circuit generators of each of the television cameras 1 and 3 as well as to the deflection voltage generator 8.

The operator moves the writing instrument 9 on the writing surface 4 in the field of view of the marking camera 3. To make the point of the writing instrument visible to the camera, the point of the instrument is brightly illuminated as by a light source within the instrument, more fully hereinafter described in connection with Fig. 2, or by reflected light more fully hereinafter described in connection with Figures 3 and 4.

According to an important feature of this invention the main television camera signal and its superimposed marking picture is displayed upon the screen 10 of the monitor cathode ray tube 11, the screen being adjacent to the light surface 4 and in the field of view of the operator. Deflection voltage generator 8 is coupled to the deflection yoke 12 and the output of the signal combining circuit 6 is applied to the grid 13. Hence, the lines of the raster displayed on screen 10 are synchronized with the sweeps of the television cameras and the grid signal visually reproduces the combined video signals. Placement of marks on writing surface 4 may thus be determined by observing the picture displayed on screen 10. Distortion in any of the video or deflection circuits tending to produce loss of registry between the two pictures is compensated for by the operator with his information obtained at the monitor screen.

The synchronous generator 7 is coupled to apply its timing pulses to the signal combining circuit 6 so that at the output terminals of the combining circuit appears the composite video signal with the timing pulses. The output composite signal is transmitted to one or more remote reading stations. Each station comprises the detector 20 for separating the synchronous pulses from the composite signal and for isolating the carrier wave if any. The video signals are amplified at 21, and the synchronous pulses are applied to the deflecting voltage generator 22. The video signals of the amplifier 21 are applied to the control grid of the cathode ray tube 23 while the saw-tooth deflecting voltage, properly amplified, is applied to the deflecting yoke of the tube. It will be noted that nonlinear saw-tooth waves, for example, in generator 22 will distort the composite picture but will not disturb the relative positions of corresponding picture elements of the two video signals. Likewise, distortion in the detector or video amplifier circuits are not effective in disturbing the relative time phase or positions of the elements of the two pictures.

The composite signal at the output of the signal combining network 6 may be transmitted to the remote reading stages via coaxial cables 18 or via the usual television radiated carrier waves.

The self illuminated writing instrument 9 is shown in some detail in the sectional view of Fig. 2. A writing instrument, resembling the conventional inexpensive mechanical pencil, has a barrel 30 with the usual lead screw 31 and the stick 32 or lead of crayon. At the outer end of the pencil is mounted a lighthouse with light openings to the end of the barrel. The barrel is composed of a light transmitting material such as commercially obtainable "Lucite," which is a fairly efficient transmitter of light. The opposite end of the barrel is shaped to focus the emanating rays of light upon the sharpened point of crayon. The crayon may be of any composition or color which will reflect light to which the marking television camera is responsive. In case marks are not to be left upon the writing surface 4 the material of stick 32 may be of wood, metal or any material which will not scribe the writing surface, the principal property of the stick being the light reflecting property at its tip.

Alternative to the self illuminating pencil of Fig. 2 is the illuminated writing panel of Fig. 3. Here, the illumination of the point of the writing instrument is obtained from sources of light placed along the edge of the writing panel 4. The material of the panel 4 may be clear or lightly frosted glass or thermoplastic. Light bulbs 33 enclosed in lighthouses 34, with the aide of lenses 35 project a sheet of light parallel to the panel surface for illuminating any object placed upon the panel. The end of writing instrument 36 should reflect light that will most effectively activate the camera 3. As desired, the point of the writing instrument 36 may be of crayon which will leave a mark on the surface of panel 4. Fortunately, light transmitted into the edge of the panel will illuminate the written marks applied to the surface of the glass, and will make any design drawn on the panel plainly visible to the camera.

The term "camera" or "television camera" as used throughout this specification may include, within the scope of this invention, any of the well known devices for optically distinguishing pictures or marks and for transmitting video signals corresponding to those pictures or marks. The video signal comprises a voltage varying in amplitude as successive incremental areas of a scene are scanned by an electron beam as in the commercial "Image Orthicons" or "Iconscopes," or by a spot of light and viewed by phototubes as in the so called fly spot system. The sources of illumination for the writing instrument of Figures 2 and 3 may be conveniently replaced by the fly spot system of Fig. 4. The focusing potentials of the cathode ray tube 40 adjusted to produce a spot of light on the screen of the tube, which spot is moved systematically across the screen in parallel lines under the control of saw-tooth waves of deflection voltage generator 8. The moving spot of light through condensing and focusing lenses 41 and 42 will scan the underside of the light panel 4. Each time the moving spot traverses the point of the writing instrument 36, or traverses any mark left by the writing instrument on the panel 4, the phototubes 43 respond with a change in space current. The phototube current thus modified constitutes the video signal which may be amplified as at 5 and then combined at 6 with the main camera signal as described above.

The television display and writing pick-up system of this invention combines video information obtained from different sources, combines the video signals, and displays the combined video signals upon remote display screens without losing the relative time phase or position of the elements of the two pictures. This system preserves the relative time phases of the picture elements notwithstanding distortions usually caused by nonlinear saw-tooth voltages, uneven video attenuations, and dissimilarities in the several camera circuits. The invention, defined with particularity in the following claims, may be modified in many details without departing from the spirit or scope of the invention.

What is claimed is:

1. A television writing pick-up system comprising: a writing surface and a writing instrument manipulatible by an operator with the writing instrument point and the marks produced thereby on said writing surface being distinguishable by a television camera; a main television camera for viewing scenes, a marker television camera for viewing said writing surface, and a monitor picture tube positioned adjacent said writing surface and viewable by a writing instrument operator; a synchronizing electrical means coupled in common to said cameras and said picture tube for synchronizing the deflection circuits thereof; a video signal combining circuit coupled to said cameras for superimposing the video signals of one camera on the video signals of the other camera and displaying them on said monitor picture tube; and means for transmitting the composite video signals for remote reading television stations.

2. A television writing pick-up system comprising: a writing surface and a writing instrument manipulatable by an operator with the writing point of the instrument and marks made thereby on said writing surface being distinguishable by a light sensitive television camera; a first light sensitive television camera positioned to view said writing surface; a second light sensitive television camera for viewing scenes; a monitor cathode ray tube positioned to be viewed by the operator of said writing instrument; a beam deflection circuit and a synchronous generator coupled to commonly control the beams of said cameras and monitor cathode ray tube in synchronism; circuit means combining the video signals of said camera tubes, said circuit means being coupled to said cathode ray tube to reproduce the video scene sensed by said second television camera with the writings superimposed thereon as sensed by said first television camera; and means for transmitting the superimposed composite video signals to remote television receivers whereby accurate writings over a scene by an operator may be accurately transmitted for remote reception.

3. A television writing pick-up system as set forth in claim 2 wherein said writing surface is transparent and said writing instrument has a writing point of a material capable of leaving marks on said writing surface and a means for illuminating said writing point and marks, and said light sensitive television camera views said writing surface from the side opposite to said writing instrument.

4. A television writing pick-up system as set forth in claim 2 wherein said writing surface is transparent, said light sensitive television camera views from a side opposite to said writing instrument, and said writing instrument has a point illuminated by light disposed along the edge of said writing surface.

5. A television writing pick-up system as set forth in claim 2 wherein said light sensitive television camera positioned to view said writing surface produces a flying spot of light that scans the writing surface to illuminate marks on said writing surface left by said writing instrument, and said illuminated marks are video sensed by phototubes disposed to view said writing surface.

References Cited in the file of this patent

UNITED STATES PATENTS

| | | |
|---|---|---|
| 2,251,984 | Cleaver et al. | Aug. 12, 1941 |
| 2,480,868 | Marhall | Sept. 6, 1949 |
| 2,487,641 | Denk | Nov. 8, 1949 |
| 2,520,600 | Jones | Aug. 29, 1950 |
| 2,521,635 | Kornei | Sept. 5, 1950 |
| 2,522,528 | McNally | Sept. 19, 1950 |
| 2,534,610 | Marcy | Dec. 19, 1950 |
| 2,621,246 | Clayton et al. | Dec. 9, 1952 |
| 2,632,157 | Jones | Mar. 17, 1952 |